US012411265B2

(12) United States Patent
De Angelis et al.

(10) Patent No.: US 12,411,265 B2
(45) Date of Patent: Sep. 9, 2025

(54) PHOTONIC CHIP WITH EDGE COUPLER AND METHOD OF MANUFACTURE

(71) Applicant: Telefonaktiebolaget LM Ericsson (publ), Stockholm (SE)

(72) Inventors: Gabriele De Angelis, Pisa (IT); Stefano Tirelli, Pisa (IT); Marco Romagnoli, Pisa (IT); Alessandra Bigongiari, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 17/918,505

(22) PCT Filed: Apr. 16, 2020

(86) PCT No.: PCT/EP2020/060741
§ 371 (c)(1),
(2) Date: Oct. 12, 2022

(87) PCT Pub. No.: WO2021/209139
PCT Pub. Date: Oct. 21, 2021

(65) Prior Publication Data
US 2023/0142315 A1  May 11, 2023

(51) Int. Cl.
*G02B 1/04* (2006.01)
*G02B 6/12* (2006.01)
*G02B 6/122* (2006.01)
*G02B 6/28* (2006.01)

(52) U.S. Cl.
CPC ........... *G02B 1/048* (2013.01); *G02B 6/1225* (2013.01); *G02B 6/2821* (2013.01); *G02B 2006/12147* (2013.01)

(58) Field of Classification Search
CPC ..... G02B 1/048; G02B 6/1225; G02B 6/2821
See application file for complete search history.

(56) References Cited

U.S. PATENT DOCUMENTS

| 7,164,838 B2 | 1/2007 | Blauvelt et al. |
| 9,274,275 B2 | 3/2016 | Webster et al. |
| 9,588,298 B2 | 3/2017 | Novack et al. |

(Continued)

OTHER PUBLICATIONS

International Search Report and Written Opinion of the International Searching Authority for PCT International Application No. PCT/EP2020/060741 dated Jan. 14, 2021.

(Continued)

*Primary Examiner* — Tina Wong
(74) *Attorney, Agent, or Firm* — Sage Patent Group

(57) ABSTRACT

A photonic chip is disclosed that comprises a cladding material and an edge coupler. The edge coupler comprises a composite guiding structure that comprises a plurality of substantially parallel planar layers of optical guiding material. Each layer of the composite guiding structure extends into the cladding material, wherein each layer is aligned at a first edge of the photonic chip. The layers overlap along a first axis which is perpendicular to a plane of the planar layers of optical guiding material. The photonic chip is arranged for deposition of a waveguide on the cladding material, the waveguide being arranged to at least partially overlap along the first axis with a layer of the composite guiding structure.

Also disclosed is a method of manufacturing a photonic chip.

18 Claims, 10 Drawing Sheets

(56) References Cited

U.S. PATENT DOCUMENTS

| | | |
|---|---|---|
| 9,933,566 B2 | 4/2018 | Patel et al. |
| 11,275,211 B2 * | 3/2022 | Kopinetz ............. G02B 6/3636 |
| 2016/0266321 A1 | 9/2016 | Tummidi et al. |

OTHER PUBLICATIONS

Papes et al., "Fiber-Chip Edge Coupler with Large Mode Size for Silicon Photonic Wire Waveguides," Proc. SPIE 9516, Integrated Optics: Physics and Simulations II, May 1, 2015, pp. 95160K-1-95160K-6.

Wang et al., "Silicon-Nitride-Assisted Edge Coupler Interfacing with High Numerical Aperture Fiber," IEEE Photonics Technology Letters, vol. 31, No. 5, Mar. 1, 2019, pp. 349-352.

Socci et al., "300 nm bandwidth adiabatic SOI polarization splitter-rotators exploiting continuous symmetry breaking," Optics Express, vol. 23, No. 15, Jul. 27, 2015, pp. 19261-19271.

Yin Xu et al., "Ultracompact and high efficient silicon-based polarization splitter-rotator using a partially-etched subwavelength grating coupler," Scientific Reports vol. 6, Article No. 27949 (2016) pp. 1-11.

\* cited by examiner

PHOTONIC CHIP WITH EDGE COUPLER AND METHOD OF MANUFACTURE

TECHNICAL FIELD

The present disclosure relates to a photonic chip with an edge coupler for coupling light to an optical waveguide. The present disclosure also relates to a method of manufacturing a photonic chip with an edge coupler.

BACKGROUND

Silicon photonic chips guide light through high and/or medium contrast index waveguides. Waveguides are generally formed of a core of higher refractive index material surround by a cladding fabricated from a lower refractive index material. A waveguide with a difference in refractive index between the core and the cladding which is less than 5% is defined as working within a low contrast regime. A difference in refractive index of between 5%-40% is defined as working within a medium contrast regime, and a difference of greater than 40% is defined as a high contrast index regime.

The level of confinement of light within the waveguide is determined by the index contrast regime. The higher the index contrast regime, the more the light is confined. A higher confinement of light leads to smaller size and footprint of the photonic component. The mode size for a silicon waveguide on an insulator platform is less than 1 μm. However, the smaller size comes with a drawback that higher contrast index waveguides have increased losses, which are typically 1 dB/cm for photonic chips formed from silicon insulator platforms.

Low contrast index waveguides include standard optical fibres (or fibers) with a core made of glass e.g. Corning®. Such fibres are commonly used in telecommunication networks to send data via the modulation of a light carrier wave over long distances of typically several kilometres. The low losses of these fibres, of the order of 0.2 dB/km, make them desirable for such applications. The lower light confinement of these fibres gives the fibres a circular mode shape with a typical diameter size of about 10 μm.

Photonic chips may be employed to perform several operations on light carrier waves, including modulating, switching, routing and filtering, as well as more complex functions.

To perform any such operations, light from an incoming optical fibre should be connected to the photonic chip. Similarly, once the operation is performed, light from the photonic chip is carried out of the chip through the connection of the chip to an outgoing optical fibre. In order to connect an incoming/outgoing fibre to a photonic chip e.g. at an interface with a photonic transceiver, the larger fibre mode (~10 μm) should be adapted to the smaller waveguide mode (~1 μm).

Many techniques exist to connect an incoming/outgoing optical fibre to a photonic chip. However, they can be broadly grouped into two categories: grating couplers and edge couplers.

Grating couplers are formed in a pattern on a surface of a photonic chip e.g. a top or bottom surface. This pattern is then interfaced with an end surface of an optical fibre such that the fibre axis forms an angle of less than 10° with the chip surface normal. To attach the fibres to the photonic chip with a grating coupler, the fibres are generally grouped into a ribbon and attached to the grating coupler with a glass connector e.g. a glass block. Glue or other fillers may also be used to keep the connector in place.

Edge couplers, which are also commonly named butt couplers, perform light coupling at the edge of the photonic chip. The fibre is interfaced with a side face of the photonic chip, where conversion between the mode of the optical fibre and the photonic chip is performed. Common techniques to perform the mode conversion include: i) tapering of the waveguide in combination with tapering of the fibre itself, ii) refractive index adaptation methods, such as subwavelength gratings and iii) evanescent coupling methods such as spot size converters and combinations thereof.

Grating couplers are advantageous in certain applications owing to their relatively small footprint, the fewer lithography steps used in their fabrication, and their potential for polarization diversity through the use of dual polarization grating couplers. However, grating couplers also suffer from a number of drawbacks.

One such drawback is that grating couplers are not broadband. Grating couplers can generally only accommodate incoming light that lies within a relatively narrow range, of the order of about 20 nm, around the nominal value of operation of the grating. This nominal value corresponds to the wavelength of maximum coupling and is determined by design. Grating couplers also use a vertical connector to connect to a surface of the photonic chip e.g. top or bottom surface. The vertical connector, such as a glass block, generally carries a large horizontal and vertical footprint, of the order of mm, which is undesirable in most applications. Furthermore, whilst gratings with an insertion loss of the order of 4-5 dB have a relatively simple fabrication process, producing gratings with lower losses requires more complex lithography and processing techniques to fabricate specific grating features and supporting layers.

Edge couplers remedy some of the disadvantages of grating couplers, in that they are broadband and allow a flat connection of the fibres to the photonic chip, which reduces the footprint in the vertical dimension. However, for certain applications, the edge coupler may require a relatively large horizontal footprint for the mode adaptation between the optical fibre and the photonic chip. The larger horizontal footprint can also increase the overall cost of the photonic chip.

Several methods have been investigated to provide mode adaption between edge couplers and optical fibres with a reduced footprint. A class of methods that has been widely investigated in this field aims at achieving the conversion of the mode between the fibre and the chip via multicore waveguides, or by including layers of materials with different refractive indices within the edge coupler. These methods may be based on: i) evanescent coupling of the incoming mode with a distribution of waveguide cores, ii) transfer of light to an output waveguide, iii) shaping the effective refractive index via layers of multiple materials, and iv) adiabatic index/shape variation of guiding elements and combinations thereof.

U.S. Pat. No. 7,164,838 describes a method in which the adaptation is implemented via multiple core planar waveguides, the waveguides comprising a main core surrounded by a lower core layer and an upper core layer. The upper core layer and the lower core layer both extend laterally either side of the main core. The upper core layer and the lower core layer are separated from the main core by a cladding, with further cladding material on top of the upper core layer and underneath the lower core layer. The cladding has a refractive index such that the difference between the refractive index of the cladding and the upper and lower core layers is within a low index contrast regime, and the difference between the cladding and the main core is within a high index contrast regime. In this method the core layers enlarge the mode of the central main core to provide spatial mode matching with the input light from an optical fibre, for example. The light therefore gradually transfers from the upper and lower layers to the central main core.

The method in U.S. Pat. No. 7,164,838 has disadvantages in terms of fabrication. In this method, the waveguide is buried under substantial layers of cladding material. This makes it difficult to access the waveguide to provide electrical couplings to optical components in the silicon layer, such as heaters for thermal tuning or drive electrodes for modulators. Heaters are generally fabricated in the back-end of a production line (BEOL). The techniques used to deposit metal on a chip generally use physical vapor deposition or sputtering-etching processes, which often involves the contamination with metals, which may preclude certain processing operations in the front-end of line (FEOL). The fabrication of waveguides is generally carried out in the FEOL, which involves a CMOS-compliant environment strictly restricting contamination by some metals. A buried waveguide therefore presents a number of undesirable challenges in the fabrication process of the chip.

One technique to access a buried waveguide is to etch away part of the cladding at a location away from the edge coupler. However, this process results in a chip surface layer with a varying thickness of the cladding layer. The presence of a non-uniform surface leads to limitations in the design freedom for the location of the heaters, and also results in increased processing complexity and cost. For example, photo-resist deposited on the surface of the chip may have an irregular thickness. Thinner regions of photo-resist may lead to areas of cladding being substantially uncovered. Uneven or overly thick regions of photo-resist can lead to limitations on the resolution of the features that can be fabricated.

U.S. Pat. No. 9,588,298 describes a similar concept that uses multiple cores. The method uses several core layers of a semiconductor material with higher refractive index, interleaved with a cladding material of lower refractive index. These core layers form a composite input port and may have a geometrical arrangement that forms a 2D or linear array. The waveguide cores are medium contrast waveguides, with cores formed of a semiconductor material such as silicon nitride, and cladding formed of a dielectric material such as silicon dioxide. The output waveguide core is located below the other cores when viewed along the axis of propagation of light along the waveguide. The output waveguide core is tapered such that the end of the core nearest the edge of the chip is larger in dimension than the end of the waveguide located further into the chip. This tapering structure can aid in the coupling of light from the edge coupler to the photonic chip. With this edge coupler configuration, incoming light is coupled into the multiple core layers above the output waveguide core, and light is evanescently coupled from these cores to the output waveguide core below them.

The method described in U.S. Pat. No. 9,588,298 involves several fabrication steps to superpose the input core layers on top of the output waveguide core. This method also suffers from the limitations relating to the coupling of components such as heaters to the output waveguide and the contamination of metals in BEOL, which limits the processing in the FEOL. Furthermore, this method involves a larger number of layers on top of the main core, which puts the main core under increased stress. In this method, the output waveguide needs to be carefully aligned with the other layers, with the output waveguide suffering the same increased stress level as the other cores. This leads to very little tolerance in the alignment of the waveguide, and consequent difficulties in manufacture. Furthermore, this method uses prongs rather than layers, which are more difficult to manufacture.

The issue of introducing metal routes in a multi layered edge coupler is addressed in US patent application no. 2016/0266321 and in U.S. Pat. No. 9,933,566. The proposed methods involve the creation of multiple layers of metals connected by vias. These methods have the drawback of involving more fabrication stages, which increases the probability of occurrence of fabrication defects.

In general prior art edge couplers further suffer from issues with testing the optical components during the fabrication process. It is not possible to include test structures with vertical output (e.g. grating couplers) to assess the quality of fabrication of waveguides before metal deposition or before dicing. The inability to perform testing during the production process can significantly reduce the efficiency and yield of the production process.

Edge coupler solutions have been proposed to overcome this limitation by placing the output waveguide on top of the multicore structure, for example, as described in U.S. Pat. No. 9,274,275. In this fabrication method, the device layer (i.e. the layer containing the output waveguide and main photonic chip elements) is transferred on top of the multicore stack by means of a mechanical transfer (e.g. flip-chip or wafer bonding). Such mechanical transfers are necessary because thermal processes (e.g. high-temperature annealing) may have to be carried out separately on the multi-core stack and on the device layer. The method, however, has the drawback of posing significant design limitations to the type and the geometry of the device layer. The technique is feasible in silicon oxide substrates, but cannot be extended to materials such as silicon nitride, where the device layers are generally affected by significant stress and may not be readily transferrable. Also, non-planar devices with, e.g., metal plugs for resistive heaters or other similar protruding structures, may pose additional challenges to a wafer-scale, transfer-based approach.

Additionally, the edge couplers presented in the prior art do not account for the possibility to manage polarization diversity of light.

SUMMARY

It is an aim of the present disclosure to provide an apparatus and method of manufacture thereof which obviates or reduces at least one or more of the disadvantages mentioned above.

According to a first aspect of the present disclosure there is provided a photonic chip that comprises a cladding material and an edge coupler. The edge coupler comprises a composite guiding structure that comprises a plurality of substantially parallel planar layers of optical guiding material. Each layer of the composite guiding structure extends into the cladding material, wherein each layer is aligned at a first edge of the photonic chip. The layers overlap along a first axis which is perpendicular to a plane of the planar layers of optical guiding material. The photonic chip is arranged for deposition of a waveguide on the cladding material, the waveguide being arranged to at least partially overlap along the first axis with a layer of the composite guiding structure.

According to examples of the present disclosure the photonic chip may be arranged for deposition of a waveguide on an upper surface of the cladding material.

According to examples of the present disclosure a width of each layer of the composite guiding structure may decrease from a first end of the layer, which is at the first edge of the photonic chip, to a second end of the layer opposite the first end.

According to examples of the present disclosure a length of at least one of the layers of the composite guiding structure may be different to a length of at least one other of the layers of the composite guiding structure.

According to examples of the present disclosure a length of each layer of the composite guiding structure is different to a length of each of the other layers of the composite guiding structure. According to such examples, the length of each of the plurality of layers may increase with reduced distance from a surface on which the photonic chip is arranged for deposition of the waveguide.

According to examples of the present disclosure the photonic chip may be arranged for deposition of a waveguide on a surface of the cladding material, where waveguide may be arranged to at least partially overlap a layer of the composite guiding structure that is closest to the waveguide. According to such examples the waveguide may be arranged to at least partially overlap with only the layer of the composite guiding structure that is closest to the waveguide.

According to examples of the present disclosure the composite guiding structure may comprise three substantially parallel planar layers of optical guiding material.

According to examples of the present disclosure the composite guiding structure may comprise an upper layer, a middle layer, and a lower layer, and wherein a length of the middle layer is greater than twice a length of the lower layer.

According to examples of the present disclosure the composite guiding structure may comprise an upper layer, a middle layer, and a lower layer, and wherein a length of the upper layer is greater than twice a length of the middle layer.

According to examples of the present disclosure the cladding material may comprise silicon dioxide.

According to examples of the present disclosure a difference between a refractive index of the layers of optical guiding material and a refractive index of the cladding material may be within a medium contrast index regime.

According to examples of the present disclosure the optical guiding material comprises silicon nitride.

According to examples of the present disclosure a separation along the first axis between the each of the plurality of layers in the composite guiding structure may be equal. According to such examples a separation along the first axis between the composite guiding structure and a surface of the cladding material for deposition of a waveguide thereon, may be greater than the separation between each of the plurality of the layers.

According to examples of the present disclosure the photonic chip further comprises a marker element, the marker element may indicate a position of the edge coupler.

According to examples of the present disclosure the photonic chip may further comprise a waveguide deposited on the surface of the cladding material, the waveguide comprising features as set out in any one of the preceding claims.

According to examples of the present disclosure the waveguide may comprise a first end that at least partially overlaps with a layer of the composite guiding structure in a direction of propagation of light along a layer of the plurality of layers, and a width of the waveguide may increase away from the first end.

According to a second aspect of the present disclosure there is provided a method of manufacturing a photonic chip. The method comprises: providing cladding material; forming an edge coupler, comprising depositing a composite guiding structure comprising a plurality of substantially parallel planar layers of optical guiding material; wherein each layer of the composite guiding structure extends into the cladding material, wherein each layer is aligned at a first edge of the photonic chip and wherein the layers overlap along a first axis which is perpendicular to a plane of the planar layers of optical guiding material; and forming a surface of the photonic chip for deposition of a waveguide on the cladding material, the waveguide being arranged to at least partially overlap along the first axis with a layer of the composite guiding structure.

According to examples of the present disclosure forming the edge coupler may comprise (a) removing a portion of the cladding material at a first end of the cladding material along a first axis to form a cladding material surface; (b) fabricating a planar layer of optical guiding material on the cladding material surface; (c) depositing a cladding material onto the layer of optical guiding material to form a new cladding material surface; and (d) repeating steps (b) and (c) to form a composite guiding structure comprising a plurality of substantially parallel planar layers of optical guiding material interleaved with cladding material.

According to examples of the present disclosure step (a) may comprise performing a stress de-compensation procedure and step (c) may comprise performing a stress compensation procedure According to examples of the present disclosure step (b) may comprise depositing optical guiding material and removing optical guiding material to fabricate the planar layer of optical guiding material.

According to examples of the present disclosure the method may further comprise fabricating a marker element indicating a position of the composite guiding structure. According to such examples the marker element may be located on an exterior of the cladding material or may be buried in the cladding material.

According to examples of the present disclosure the method may further comprise fabricating a waveguide on the photonic chip. According to such examples, fabricating the waveguide may comprise aligning the waveguide based on the marker element.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Aspects of the present disclosure provide a photonic chip that comprises an edge coupler for coupling light between the photonic chip and an optical fibre. The edge coupler comprises a composite guiding structure that enables mode adaptation between an optical fibre and an optical waveguide, where the waveguide may be comprised in the photonic chip. The waveguide may be located above the composite guiding structure, once the composite guiding structure has been formed. The edge coupler structure gives the photonic chip a relatively small horizontal and vertical footprint. Aspects of the present disclosure also provide a method of manufacturing of a photonic chip that comprises an edge coupler for coupling light between the photonic chip and optical fibre. The method of manufacture, and the structure of the photonic chip, allow for a greater design freedom of other structures which may be comprised on the photonic chip following its fabrication. The method of manufacture and the structure of the photonic chip further allow for testing of the edge coupler structure throughout its fabrication, which increases production yield and efficiency.

Figure 1:
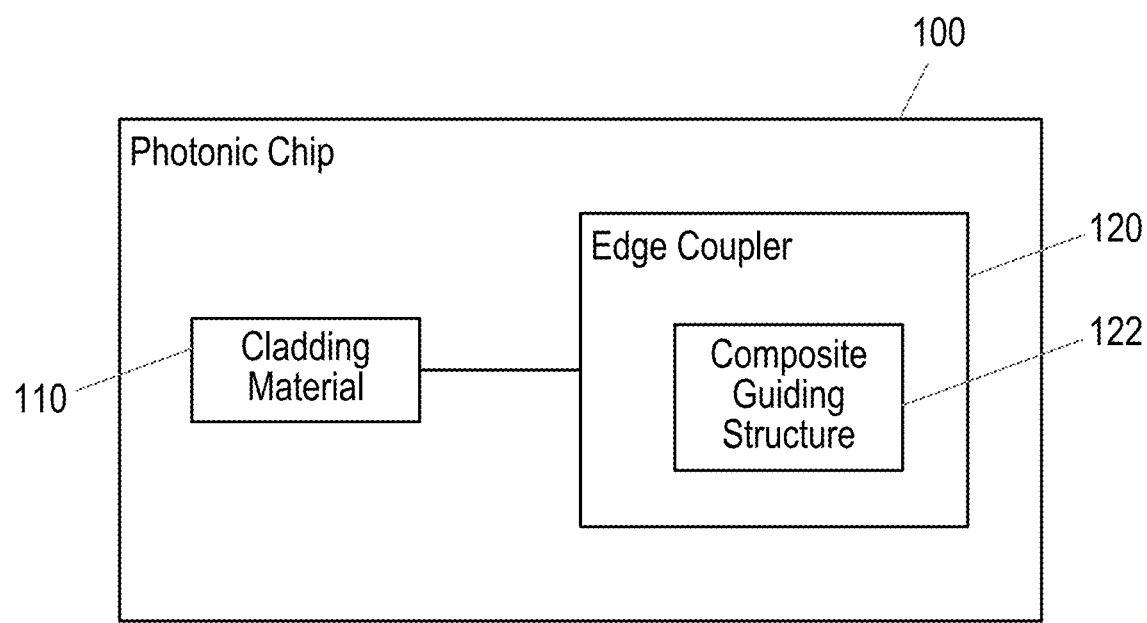
FIG. 1 is a block diagram illustrating functional units in a photonic chip.

FIG. 1 is a block diagram illustrating functional units in a photonic chip 100. Photonic chip 100 comprises a cladding material 110 and an edge coupler 120, which comprises a composite guiding structure 122. The composite guiding structure 122 comprises a plurality of substantially parallel planar layers of optical guiding material. In some examples, planar may mean that the layers have a substantially two-dimensional characteristic, i.e. that they extend principally along two dimensions forming a plane. In some examples, planar may mean that the thickness of the layer is smaller than its width and length by at least two orders of magnitude. In some examples, parallel may mean that the layers each extend in a direction along an X axis (shown in FIG. 2a), such that the layers would never intersect along the X axis. In some examples, planar may mean that a planar surface of each layer extends across an XY plane.

Each layer of the composite guiding structure 122 extends into the cladding material where each layer is aligned at a first edge of the photonic chip. In some examples, the layers being aligned may mean that the layers are aligned along a Z axis, perpendicular to the XY plane. In some examples, aligned may mean that one edge of the layers are aligned, e.g. extend to the same point on the X axis. In some examples, aligned may mean that the layers are arranged along an axis such that they are at least partially superimposed on one another. In some examples, aligned may mean that the layers are arranged along a first plane that is perpendicular to a plane of the planar layers such that an edge of the planar layers lies on the first plane. The layers are arranged to overlap along a first axis which is perpendicular to a plane of the planar layers of optical guiding material. In some examples, the first axis may therefore comprise the Z axis. In some examples, a plane of the planar layers may comprise a planar surface of the layers. In some examples, each planar surface of each layer may therefore be arranged to align and overlap with the other planar layers along the first axis. In some examples, the first axis may comprise a depth of the chip.

As will be described in more detail below, the structure of the composite guiding structure 122 provides efficient mode adaption between a waveguide and an incoming/outgoing optical fibre.

The photonic chip 100 is arranged for deposition of a waveguide on the cladding material 110. In some examples, the cladding material 110 may comprise a surface for fabrication of a waveguide thereon. In some examples, the surface of the cladding material may comprise an upper surface of the cladding material 110. A waveguide formed on the cladding material 110, for example on the upper surface of the cladding material 110, may be arranged to at least partially overlap along the first axis with a layer of the composite guiding structure 122. In some examples, the waveguide may be arranged to partially overlap with a layer of the composite guiding structure 122 along a direction in which, in use, light may propagate along one or more of the layers. In some examples, the waveguide may also be arranged to align with the layers along a direction in which, in use, light may propagate along one or more of the layers. As will be described in more detail below, the arrangement of the waveguide relative to the composite guiding structure 122 enables light to be coupled from the composite guiding structure 122 to the waveguide and vice versa.

In some examples, the waveguide comprises a first end that is arranged to at least partially overlap with a layer of the composite guiding structure. In one example, the first end of the waveguide is located nearest the first edge of the photonic chip 100. The first end of the waveguide is spaced apart from the first edge of the photonic chip 100. In one example, the waveguide may comprise a tapered profile, such that a dimension of the waveguide increases from the first end towards a second end of the waveguide opposite the first end. In one example, the dimension may comprise the width of the waveguide (e.g. in the Y axis). As will be described in more detail below, the tapering of the waveguide may assist in adapting the mode of the optical fibre to that of the waveguide and vice versa.

In some examples, each layer of the composite guiding structure may be tapered along its length i.e. a dimension of each layer may decrease from one end of the layer to the opposite end. In one example, a width of each layer (e.g. in the Y axis) of the composite guiding structure may decrease from a first end of the layer, at the first edge of the chip 100, towards a second end of the layer, opposite the first end. In other examples, one or a subset of the layers may be tapered and the other layers may not be tapered.

In some examples, a length of at least one of the layers of the composite guiding structure 122 may be different to a length of at least one other of the layers of the composite guiding structure 122. In this example, the length may refer to the length of each layer that extends from its first end, at the first edge of the chip, to the second end, opposite the first end, along an axis in which, in use, light may propagate along one or more of the layers. This is the length in the X-axis. It will therefore be appreciated that in this example, the length that one of the layers extends into the chip 100 may different than the other layers.

In some examples, the length of each layer of the composite guiding structure 122 may be different to the length of each of the other layers of the composite guiding structure 122. The length of each layer from its respective first end to its respective second end may therefore be different for each layer. In other examples, the length of each layer may be the same.

In some examples, where a waveguide is deposited and/or fabricated on the cladding material 110, the waveguide may be arranged to at least partially overlap with the layer of the composite guiding structure that is closest to the waveguide. For example, where the waveguide is deposited on an upper surface of the cladding material 110 of the photonic chip 100, the waveguide may be arranged to at least partially overlap a second end, furthest from the first edge of the photonic chip, of the uppermost layer of the composite guiding structure 122. The upper surface of the cladding material may be planar, allowing for addition of the waveguide on the photonic chip. The planar upper surface which may be parallel to the layers may provide for the waveguide to be parallel to the layers. The planar upper surface may extend continuously over the layers of the composite guiding structure and may comprise an area for the waveguide to be deposited thereon.

In some examples, the waveguide may further be configured to partially overlap with only the layer of the composite guiding structure 122 that is closest to the waveguide. For example, where the waveguide is comprised on the upper surface of the cladding material 110, the waveguide may partially overlap only with the uppermost layer of the composite guiding structure 122 and may not overlap any of the other layers of the composite guiding structure 122. Overlap may refer to overlapping in the XY plane. In such examples, the uppermost layer may therefore be different in length than all other layers of the composite guiding structure 122 such that the waveguide can be arranged to partially overlap the uppermost layer and not overlap any other layer.

In some examples, the composite guiding structure 122 may comprise three substantially parallel planar layers of optical guiding material. However, in other examples, the composite guiding structure may comprise fewer than or more than three layers. The composite guiding structure 122 may comprise an upper layer, a middle layer and a lower layer. The length of the middle layer may be longer than, e.g. greater than twice the length of, the lower layer. In another example, the length of the upper layer may be longer than, e.g. greater than twice the length of, the middle layer. In such examples, the length may comprise the distance between the first end of the layers, nearest the first edge of the photonic chip 100, and the second end, opposite the first end. In such examples, the length which the upper, middle and lower layers extend into the chip 100 may therefore be different.

In some examples, the plurality of substantially parallel planar layers of optical guiding material may each be separated by a layer of cladding material. In other examples, the plurality of substantially parallel planar layers may be separated by another insulating material other than the cladding material. In other examples, a combination of the cladding material and an insulating material may be used to separate the plurality of substantially parallel planar layers.

In some examples a difference between a refractive index of the layers of optical guiding material and a refractive index of the cladding material may be within a medium contrast index regime. As described above, a difference in refractive indices of between about 5% and about 40% may correspond to materials that are within a medium refractive index regime. The refractive index of the optical guiding material may therefore be greater than the refractive index of the cladding material. In one example, the cladding material may comprise silicon dioxide. In one example, the optical guiding material may comprise silicon nitride.

In some examples, a separation along the first axis that extends along a depth of the chip 100 (e.g. in the Z-axis or perpendicular to a direction of propagation of light along the layers) may be equal i.e. the separation between each of the layers may be substantially the same. However, in other examples, the separation between each of the layers may be different. In one example, a separation along the first axis between the composite guiding structure 122 and a surface of the cladding material 110 for deposition of a waveguide thereon, is greater than the separation between each of the plurality of the layers. Therefore in one example, the surface of the cladding material 110 may comprise an upper surface and the distance between the upper surface and an uppermost layer of the plurality of layers may be greater than a separation between each of the plurality of layers.

In some examples, the photonic chip 100 may further comprise a marker element indicating a position of the edge coupler 120. As will be described in more detail below, the marker element may be buried in the cladding material 110 and/or may be located on an exterior surface e.g. an upper surface of the cladding material 110. In one example, during fabrication of the waveguide, the waveguide may be aligned with the composite guiding structure 122 based on the marker element.

Figure 2A:
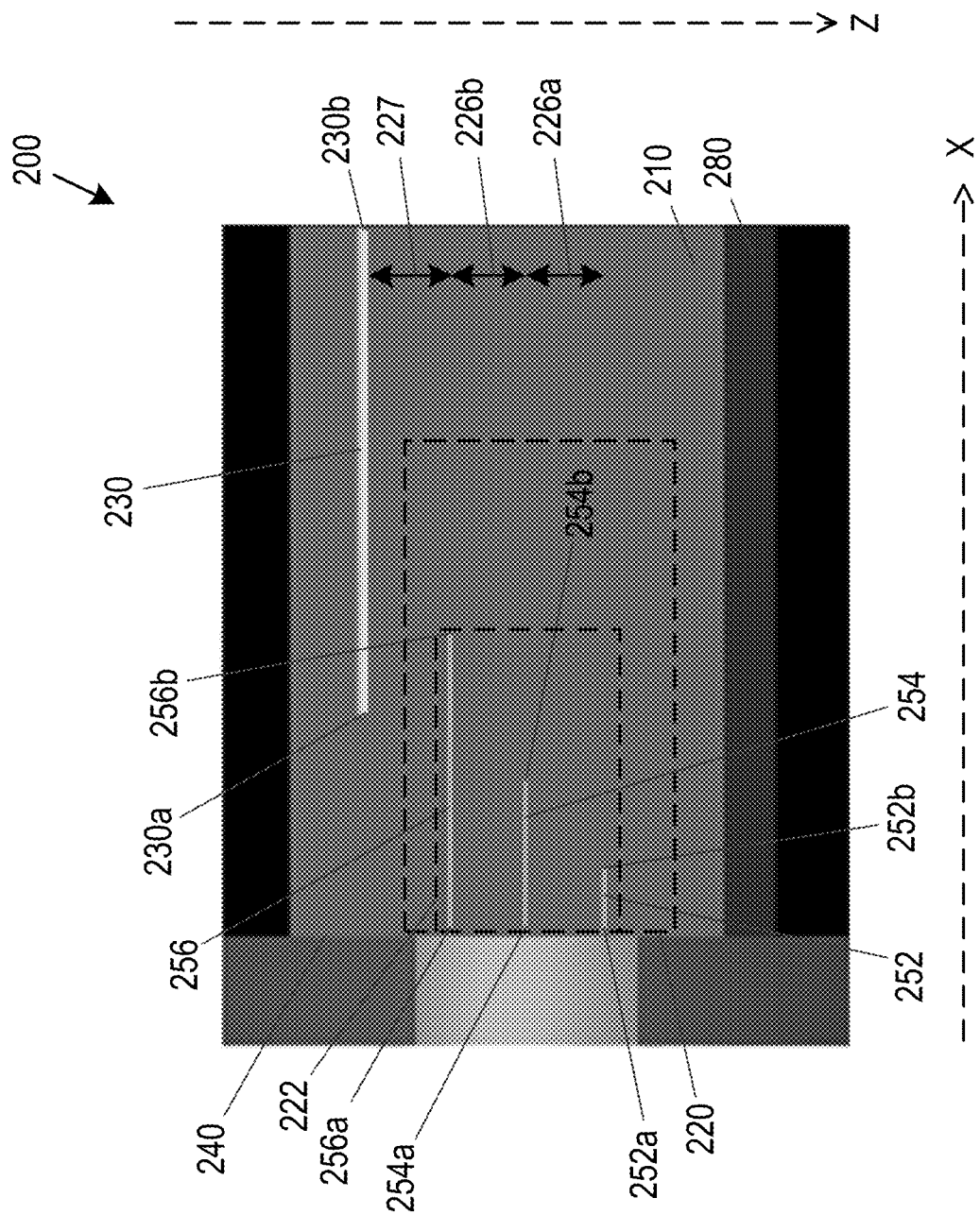
FIGS. 2a-2c are diagrams illustrating a photonic chip in cross-sectional and perspective view.

An example implementation of a photonic chip 200 is illustrated in FIG. 2a. The photonic chip 200 illustrates one way in which the functional blocks of the photonic chip 100 may be realised, as well as illustrating additional elements which may provide enhanced or additional functionality. Specifically, the photonic chip 100 is illustrated in a state in which it is arranged for deposition of a waveguide on the cladding material but before such deposition, whereas the photonic chip 200 is illustrated following deposition of a waveguide.

Referring to FIG. 2a, the photonic chip 200 comprises cladding material 210 and edge coupler 220. Photonic chip 200 may also comprise a substrate 280. In one example, the substrate 280 may comprise silicon. As will be described in more detail below, the substrate 280 and cladding material 210 may be comprised as part of a wafer and the edge coupler 220 may be fabricated into the wafer to form the photonic chip 200.

The edge coupler 220 comprises a composite guiding structure 222, which comprises a plurality of substantially parallel planar layers of optical guiding material. The plurality of optical guiding material layers may comprise three layers: a first layer 252, a second layer 254 and a third layer 256. The X axis (length) and Z axis (depth or height) are shown. The Y axis (width) is perpendicular to these axes, i.e. into the page.

Each of the layers comprises a first end, which extends from a first edge 240 of the photonic chip 200. As will be described below, the first edge 240 may comprise an interface for connecting an optical fibre to the edge coupler 220. Each layer extends into the photonic chip 200 and further comprises a second end, which is opposite the first end. First layer 252 therefore comprises a first end 252a and second end 252b, second layer 254 comprises a first end 254a and second end 254b and third layer 256 comprises a first end 256a and second end 256b. The plurality of layers are aligned with each other along a first axis Z, which is perpendicular to a plane of the planar layers of optical guiding material 252-256. As such, the layers have a common position of the first end in the X axis direction. The first axis Z also extends along a depth of the chip 200 and is perpendicular to an axis in which, in use light may propagate along each of the layers 252, 254, 256, along the X-axis.

Referring again to FIG. 2a, the plurality of substantially parallel planar layers are each separated by a layer of the cladding material 210. The first layer of optical guiding material 252 and the second layer of optical guiding material 254 are separated by a first layer of cladding material 226a.

The second layer of optical guiding material 254 and the third layer of optical guiding material 256 are separated by a second layer of cladding material 226b. Although the cladding material is described as layers, cladding material may also be considered as homogenous or continuous.

Referring again to FIG. 2a, the photonic chip 200 further comprises a waveguide 230 which is arranged to at least partially overlap along the first axis Z with at least one layer of the composite guiding structure 222. The waveguide 230 comprises a first end 230a located nearest the first edge 240 of the photonic chip 200 and a second end 230b located opposite the first end 230a of the waveguide 230.

As illustrated in FIG. 2a, the waveguide 230 is arranged to overlap the third layer 256 of the composite guiding structure 222. The waveguide 230 is separated from the third layer 256 by a third layer of cladding material 228.

Figure 2B:
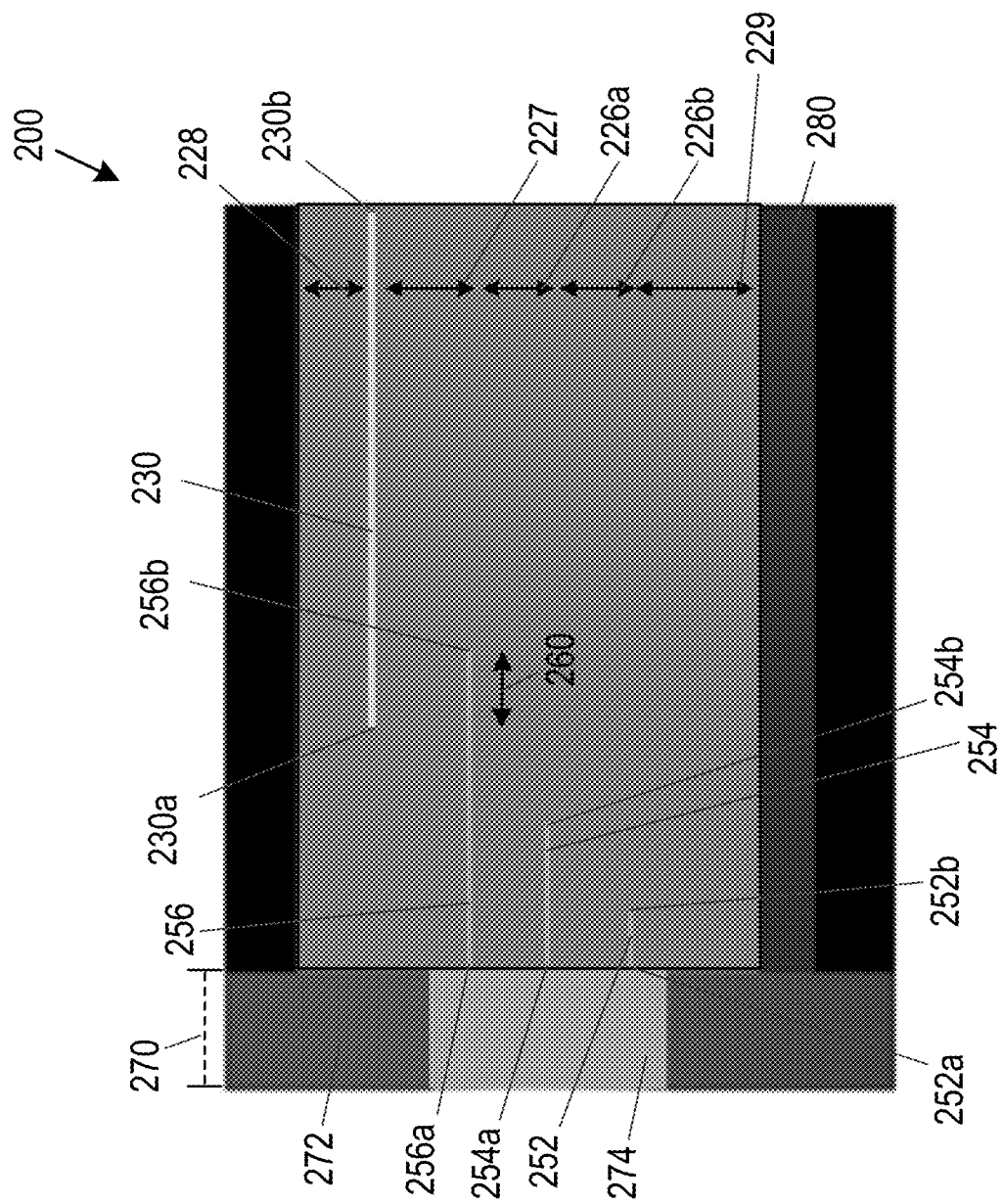
Figure 2C:
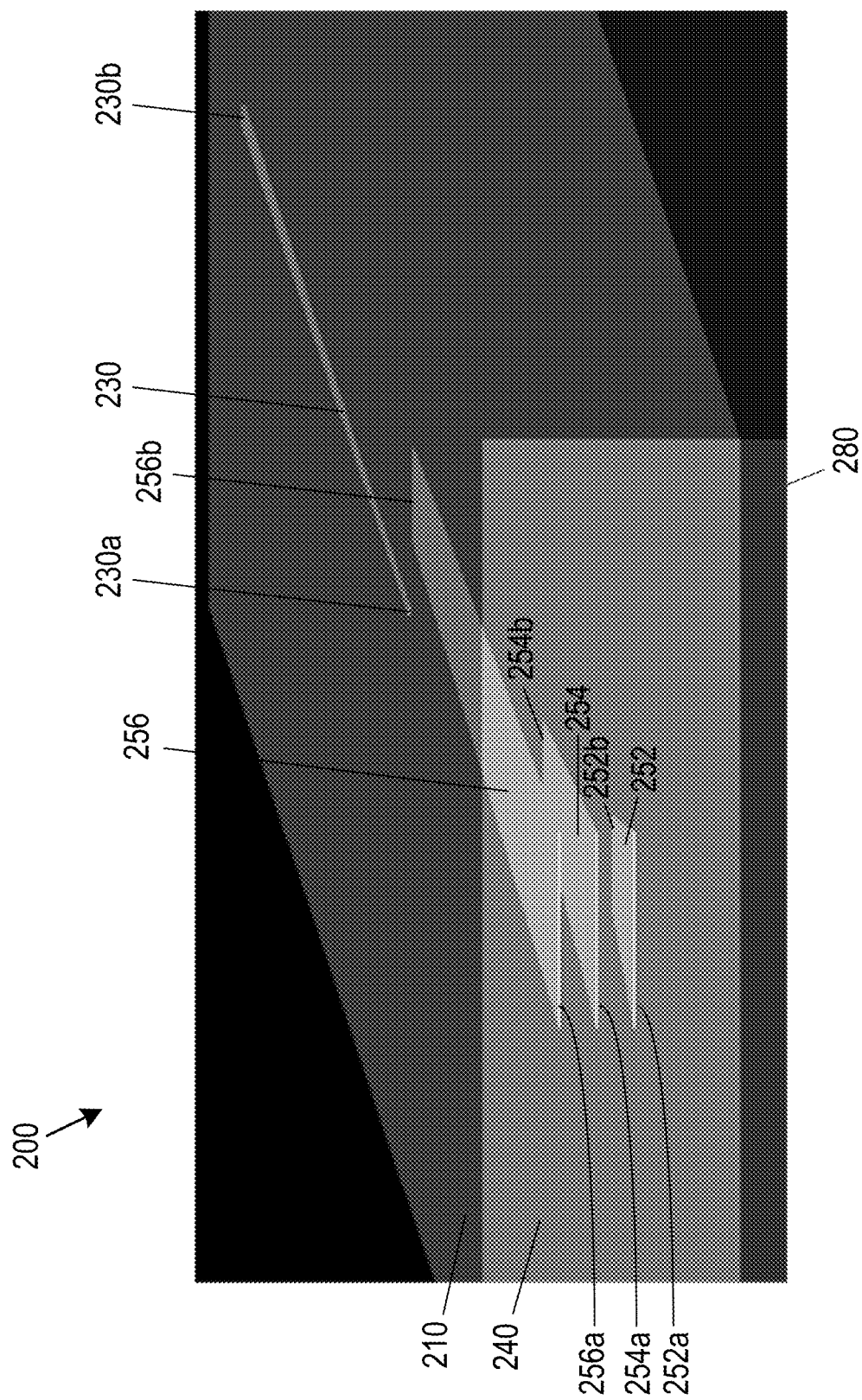

FIG. 2b and FIG. 2c show another example of the photonic chip 200 illustrating how the functional blocks of the photonic chip 100 may be realised, as well as illustrating additional elements which may provide enhanced or additional functionality. Elements with corresponding reference numerals in FIG. 2b and FIG. 2c have the same definition as given in FIG. 2a.

Referring to FIG. 2b, first layer 252, second layer 254 and third layer 256 all comprise a length that extends into the photonic chip 200 from the first edge 240 that is different. In one example, the length of the second layer 254 is greater than twice the length of the first layer 252. In another example the third layer 256 is twice as long as the second layer 254. In one example, the first layer 252 may be about 95 µm long from first end 252a to second end 252b. In one example, the second layer 254 may be about 235 µm long from first end 254a to second end 254b. In one example, third layer 256 may be about 635 µm long from first end 256a to second end 256b.

Referring to FIG. 2c, the differing lengths of the first layer 252, second layer 254 and third layer 256 is also illustrated between their respective first and second ends. As also illustrated in FIG. 2c, each of the plurality of layers 252-256 may be tapered i.e. a width of each layer may decrease from its respective first end to respective second end. In one example, a width of each first end 252a-256a of each layer 252-256 is about 10 µm and a width of each second end 252b-256b of each layer 252-256 is about 5 µm.

In some examples, at least a region of the waveguide 230 may also be tapered such that a width of the waveguide 230 increases from one end towards another end of the region.

In some examples, this may be referred to as a tapered region. Referring again to FIG. 2b, the tapered region of the waveguide 230 may extend from the first end 230a to the second end 230b. Therefore, in some examples, the waveguide 230 may extend beyond the second end 230b further into the chip 200, such that the second end 230b of the tapered region is merely a reference point indicating the location of the waveguide at which the tapering ends. A width of the tapered region of the waveguide 230 at the first end 230a may be smaller than a width of the tapered region of the waveguide 230 at the second end 230b. In one example, the width of the first end 230a may be about 0.4 µm and the width at the second end 230b may be about 1.5 µm.

Referring again to FIG. 2b, the waveguide 230 may be arranged to overlap with the third layer 256. A portion of the waveguide 230 and a portion of the third layer 256 may be arranged to overlay each other over an overlap length 260. In one example the overlap length 260 may be about 170 µm.

Referring still to FIG. 2b, the plurality of substantially parallel planar layers of optical guiding material may each be separated by a layer of cladding material. In one example, a thickness of the layers of cladding material separating the plurality of layers of optical guiding material may be equal. In the illustrated example, the first layer of cladding material 226a and the second layer of cladding material 226b both have a thickness of about 2.8 µm.

In one example, the separation between the layers of optical guiding material may be related to the thickness of the layers of optical guiding material. As will be described in more detail below, a change in the thickness of the layers of optical guiding material or the separation between the layers may result in a change in the effective refraction index of the composite guiding structure. Changes in the effective refraction index further effect the adaption of the mode between an optical fibre and a waveguide. Therefore changes in the thickness of the layers of optical guiding material or the separation between the layers should be balanced such that adaptation of the mode between the optical fibre and the waveguide may be achieved.

In one example, a thickness of each layer of optical guiding material may be about 50 nm. Therefore, in one example, if the thickness of a subset or all of the layers of optical guiding material 252-256 were to change, this may result in a change in the separation between the layers of optical guiding material in order to adapt the mode between an optical fibre and the waveguide 230. For example, if the thickness of the first or second layers were to change, then the thickness of the first layer of cladding material 226a and the second layer of cladding material 226b may also change. However, it will also be appreciated that the stoichiometric composition of the optical guiding material in an edge coupler should be preserved during fabrication. Therefore, in one example the thickness of each of the layer of optical guiding material 252-256 and the thickness of the layers of cladding material 226a, 226b, separating the layers of optical guiding material should also be selected such that the stoichiometric composition is preserved during fabrication of the photonic chip 200.

A separation between the layer of optical guiding material nearest the waveguide 230, i.e. the third layer 256, and the waveguide may be greater than the separation between each of the layers of optical guiding material e.g. first layer of cladding material 226a and second layer of cladding material 226b. In one example, the third layer of cladding material 227 between the third layer 256 and the waveguide 230 may be about 3.1 µm.

Referring again to FIG. 2b, an upper portion of the cladding material 210, which in some examples may comprise an upper surface of the cladding material 210, and the waveguide 230 may be separated by a fourth layer of cladding material 228. In one example, the fourth layer 228 may comprise a thickness of about 2.5 µm. A lower portion of the cladding material 210, which in some examples may comprise a lower surface of the cladding material 210, may be separated from the first layer of optical guiding material 252 by a fifth layer of cladding material 229. In one example, the fifth layer of cladding material 229 may separate the first layer of optical guiding material 252 from substrate 280. In one example, the fifth layer of cladding material 229 may comprise a thickness of about 7 µm.

The length of the planar layers (X axis) of the composite guiding structure is larger than then width of the planar layers (Y axis). The width of the layers is larger, or approximately equal to, the depth (thickness) of the layers (Z axis).

Referring again to FIG. 2b, photonic chip 200 may interface with an optical fibre 270 at the first edge of the chip 240. The optical fibre 270 comprises fibre cladding material 272 and a fibre core 274. In operation, the optical fibre 270 interfaces with the chip at the first edge 240 for the delivery of light to the photonic chip 200. The optical fibre 270 may comprise a single-mode fibre, a multimode fibre or a multi-core fibre. The optical fibre 270 may be coupled at the interface of the chip 200 at the first edge 240 via a number of means, as one skilled in the art will be familiar with. In one example, the fibre 270 may be coupled to the chip via a V-shaped groove to hold the fibre 270 in place at the interface at the first edge 240.

The fibre core 74 is aligned with the composite guiding structure, i.e. layers of optical guiding material 252-256. Light from (or to) the optical fiber can enter (or exit) the composite guiding structure. The composite guiding structure and fiber core 274 overlap in the YZ plane.

The light delivered from such an optical fibre 270 may be operated upon by optical modules comprised in the photonic chip 200 for example via modulators or filters. For light to undergo such operations, the light should be coupled from the optical fibre 270 to the modules of the photonic chip via the edge coupler 220.

In operation, the structure of the composite guiding structure, and the arrangement of the waveguide relative to the composite guiding structure, enable mode adaption between an optical fibre 270 and the waveguide 230 for coupling of light to/from the photonic chip. The structure of the composite guiding structure formed from the layers of optical guiding material, which may comprise a high refractive index material, and the cladding material, which may comprise a low refractive index material, results in a structure with an average refractive index that is capable of efficiently adapting the mode between an optical fibre and the waveguide. In one example, the average refractive index of the composite guiding structure may be designed such that the field distribution of the mode in the composite guiding structure has a superposition integral greater than 90% with the field of the input mode from the optical fibre.

Figure 3:
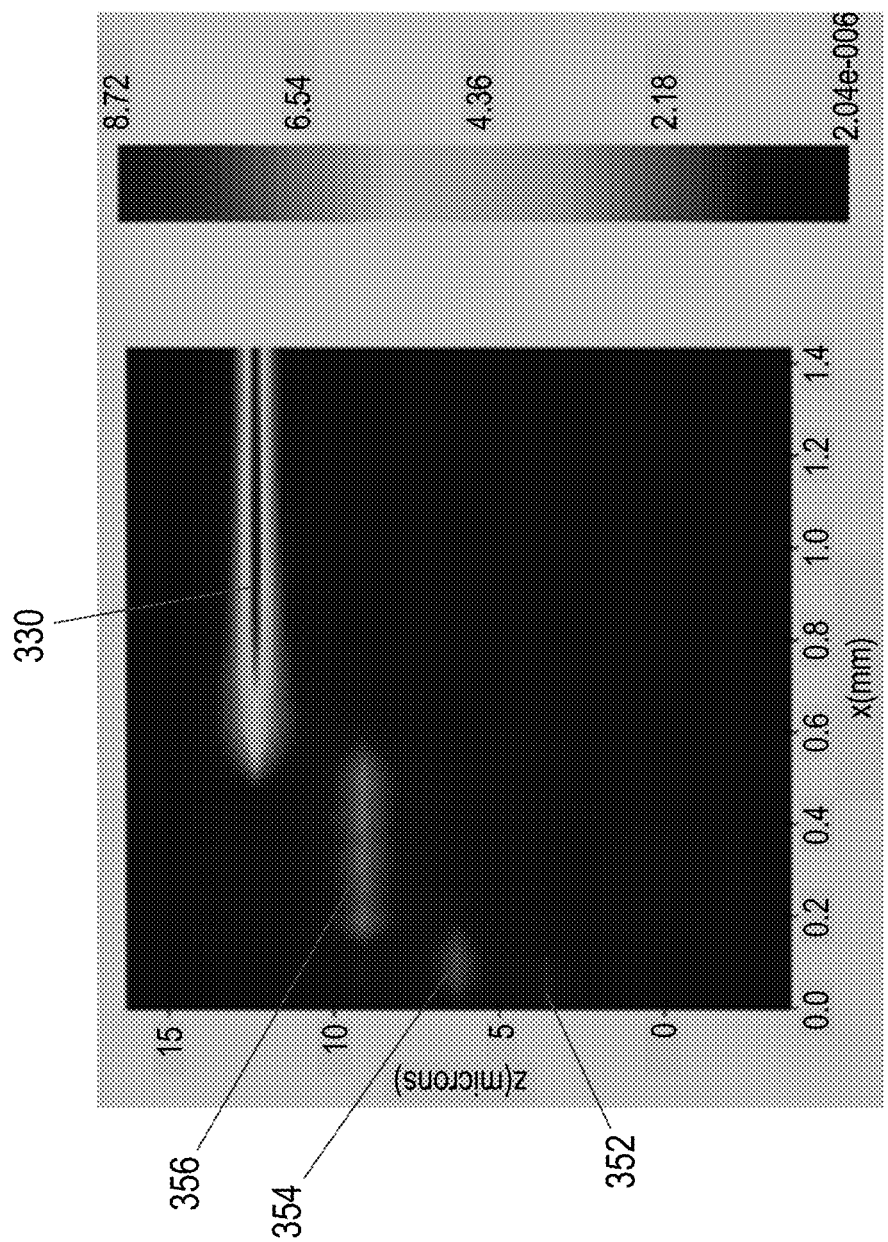
FIG. 3 is diagram illustrating the intensity of light propagating in a photonic chip.

FIG. 3 is diagram illustrating the intensity of light propagating in a photonic chip, in which the functional blocks of the photonic chip 100, or the elements in photonic chip 200, may be realised. Elements with similar reference numerals in FIG. 3 are given the same definition as given in FIGS. 2a to 2c.

The structure of the composite guiding structure enables light to be coupled evanescently from the layers of optical guiding material 352-356 to the waveguide 330. Referring to FIG. 3, light may be delivered to the photonic chip via a light delivery means such as an optical fibre at an interface between the chip and fibre e.g. at the first edge of the photonic chip. The increasing length of the layers 352-356 with reduced distance to the waveguide 330 causes the field distribution of the mode to move progressively towards the waveguide 330, with increased distance into the chip from the first edge.

Light may be incident on the composite guiding structure from the first edge, delivered from a means such as an optical fibre. Light therefore propagates from left to right along the x axis, as viewed in FIG. 3. The higher refractive index of the layers of optical guiding material compared to the cladding material means that light is transmitted into the layers 352-356 and is guided along each layer from the interface between the optical fibre and the chip at the first edge of the chip. The area occupied by the three layers means the majority of the intensity of the light from the optical fibre is coupled into the composite guiding structure.

Referring to FIG. 3, at a distance 0 along the x axis, the intensity of light may be substantially evenly spread across the three layers 352-356. As light travels along the first layer 352, at distance 0.095 mm along the x axis, the light in the first layer 352 reaches the second end of the first layer 352, opposite the first end of the layer at the first edge of the chip. The separation between the first layer 352 and the second layer 354 is designed such that light at the second end of the first layer 352 is evanescently coupled to the second layer 354. At the distance 0.095 microns along the x axis of the chip, the light in the composite guiding structure is therefore distributed between the second layer 354 and the third layer 356. At 0.235 microns along the x axis, the light in the second layer 354 has reached the second end of the second layer 354, opposite its first end at the first edge of the chip. The separation between the second layer 354 and the third layer 356 is designed such that light from the second layer 354 is evanescently coupled to the third layer 356. At distance 0.235 mm along the x axis, all of the light in the composite guiding structure is therefore comprised in the third layer 356.

The planar design of the layers of composite guiding material 352-356, the appropriate separation of cladding material between the layers 352-356, and the increasing length of the layer 352-356 with reduced distance to the waveguide 330 therefore all assist in moving the intensity of light and the field distribution of the mode towards the waveguide 330 with increased distance into the chip along the x axis. The length of the layers 352-356 is therefore designed to minimize losses and obtain smooth mode conversion along the direction of propagation of the light along the layers 352-356.

The waveguide 330 is arranged to overlap with the third layer 330 by a distance of 170 µm. With this overlap, and a third layer length of 635 µm, at 0.465 mm into the chip along the x axis, light from the third layer 356 begins to evanescently couple to the waveguide 330. At 0.635 mm along the X axis, light in the third layer 356 has reached the end of the third layer 356 and substantially all of the light in third layer 356 may have thus been evanescently coupled into the waveguide 330. The separation between the third layer 356 and the waveguide 330, as well as the overlap length between the third layer 356 and the waveguide 330, is designed such that the mode field distribution of the light is coupled into the waveguide 330.

The light in the waveguide 330 is thus guided to (or from) the other modules of the photonic chip, where the light may be operated upon. A similar procedure is also carried out to couple light from the waveguide 330 to an optical fibre at an interface between the chip and an optical fibre. The light is evanescently coupled from the waveguide 330 to the layers of the composite guiding structure and finally transmitted out to the optical fibre.

As described above, the layers 352-356 and the waveguide may each comprise a tapered profile e.g. a tapered width. The width of the layers may decrease with increased distance into the chip, which helps adapt the mode of the fibre to the mode of the waveguide 330. Conversely, the waveguide 330 may comprise a width which increases with distance into the chip. This tapering may also assist in coupling light from the third layer 356 to the waveguide 330. The width of the waveguide then widens to guide light into the chip for subsequent operations on the light.

As described above, the separation between the layers of optical guiding material 352-356 is designed to be dependent upon the thickness of the layers of optical guiding material 352-356, as changes in either the thickness or the separation can affect the effective refractive index of the composite guiding structure. However, the separation is also designed to provide efficient evanescent coupling between the layers 352-356 and to the waveguide 330. The separation should also be chosen based on the mode field diameter of the optical fibre, which may typically be about 10 µm. The separation between the layers 352-356 should therefore be designed to provide efficient coupling of light between the edge coupler and the fibre with minimal loss of intensity at the interface between the edge coupler and fibre.

The thickness of the guiding material layers 352-356 may be designed for efficient guiding of light along the layers 352-356. The thickness may be designed, in combination with the separation between the layers 352-356, to match the mode field profile of the fibre to provide efficient coupling between the edge coupler and the fibre. If the thickness is too high then separation of modes can occur, whereas if the thickness is too thin then edge effects can lead to undesirable optical phenomena. The thickness of the layers 352-356 may therefore be designed to avoid any such undesirable qualities and instead to provide efficient radiation attraction and mode guiding.

The refractive index of the materials used in the composite guiding structure and the chip should be chosen to aid in mode adaption and efficient transfer of light. Higher refractive index materials e.g. Si substrate that may in some examples, form the base of the chip may be kept away from the lower conversion region of the edge coupler, to avoid undesirable absorption and optical losses. Refractive indices of the cladding material and the optical guiding material designed within a lower index regime enable greater tolerances in fabrication, whereas materials chosen within the higher contrast index regime give better light confinement. To this end the cladding material and the optical guiding material may be chosen such that they are within the medium index contrast regime to provide a balance between the fabrication tolerances and light confinement.

One example of materials that are within the medium contrast index regime is a cladding material comprising silicon dioxide and an optical guiding material comprising silicon nitride. Silicon nitride may be an increasingly advantageous material for edge coupler fabrication compared to more conventional silicon designed edge couplers.

Figure 4:
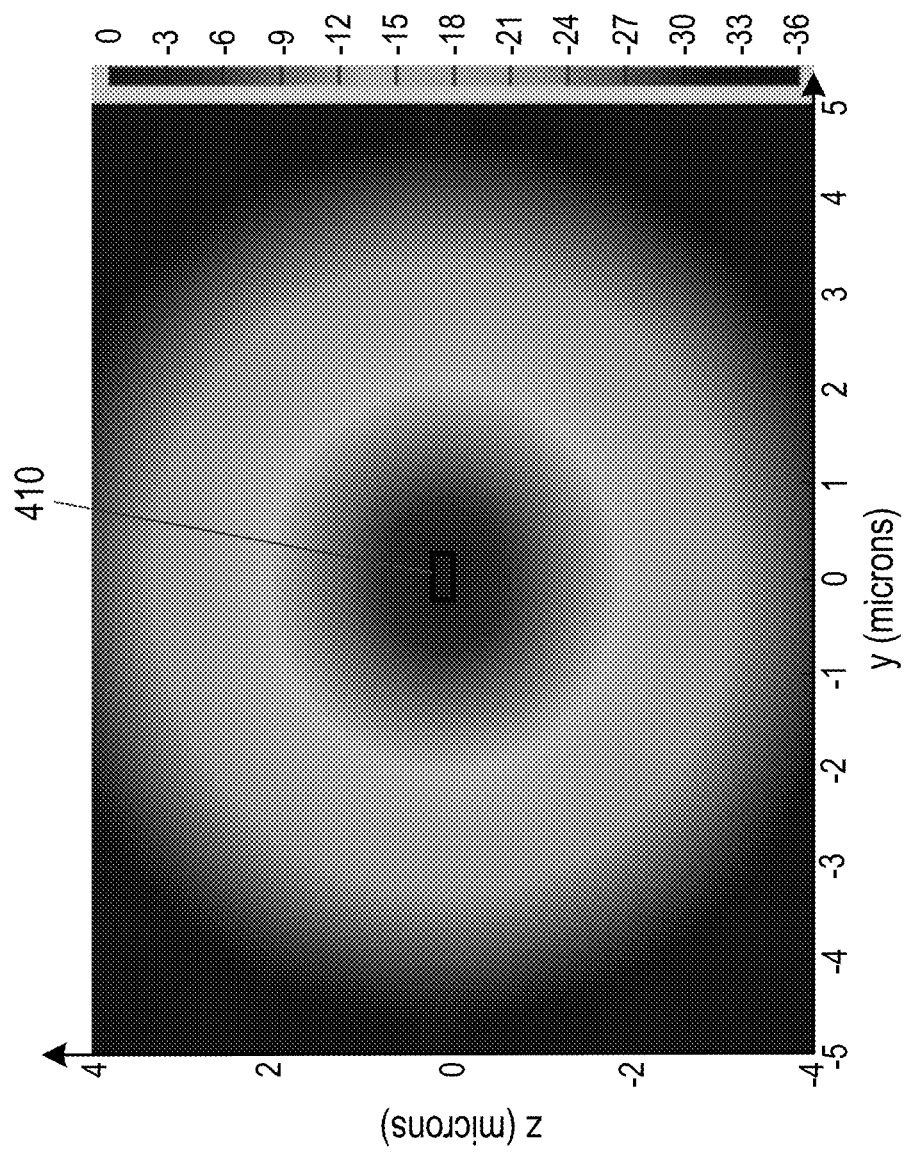
FIG. 4 is a diagram illustrating a mode field distribution of a silicon waveguide.
Figure 5:
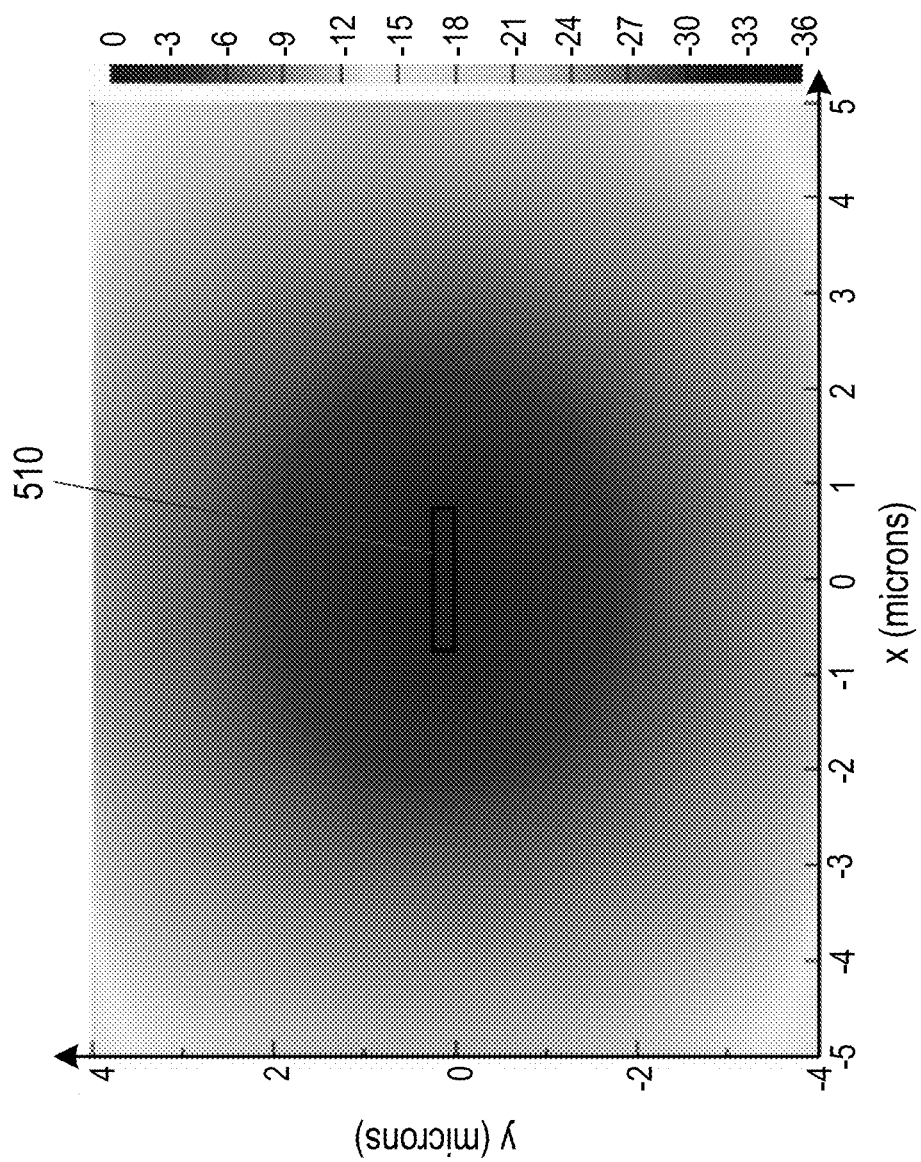
FIG. 5 is a diagram illustrating a mode field distribution of a silicon nitride waveguide.

FIG. 4 is a diagram illustrating a mode field distribution of a silicon waveguide 410, and FIG. 5 is a diagram illustrating a mode field distribution of a silicon nitride waveguide 510. FIG. 4 and FIG. 5 are simulations illustrating the mode field distribution of the waveguides obtained with the Lumerical Suite software. Due to the lower confinement of radiation in the silicon nitride waveguide 510, the mode shape has a larger cross-section than the silicon waveguide 410. The larger cross-section of the silicon nitride waveguide 510 may mean that a better matching to the mode of a light delivery means such as an optical fibre may be more easily achieved compared to a conventional silicon waveguide 410.

Figure 6:
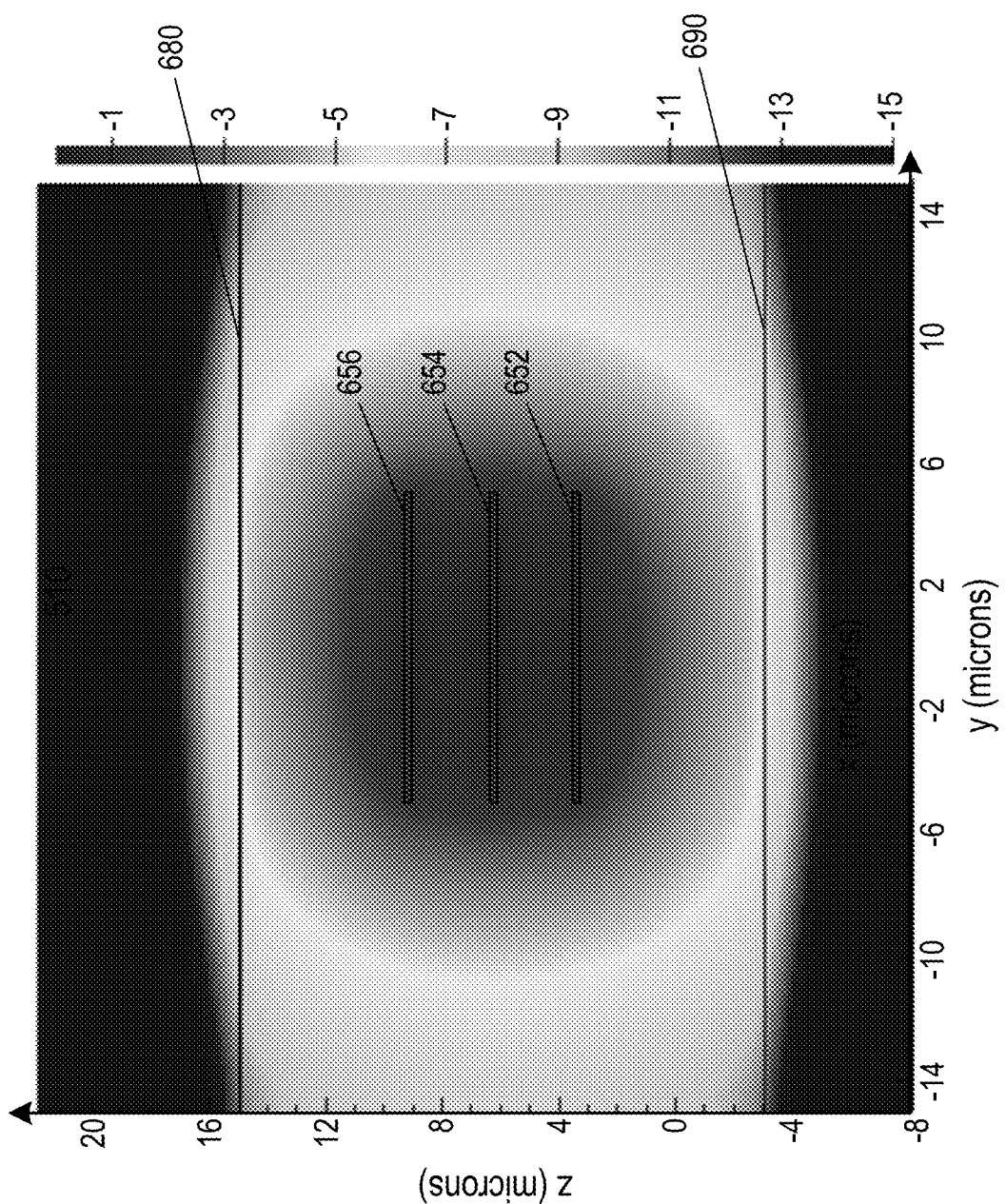
FIG. 6 is a diagram illustrating a mode field distribution of a photonic chip.

FIG. 6 is a diagram illustrating a mode field distribution of a photonic chip comprising an edge coupler according to the present disclosure. FIG. 6 illustrates the photonic chip as viewed at a first edge of the photonic chip where the edge coupler of the chip may interface with an optical fibre along the direction of propagation of the light along the layers. The photonic chip comprises an upper surface 680 and a lower surface 690. The photonic chip further comprises first optical guiding layer 652, second optical guiding layer 654 and third optical guiding layer 656. The optical guiding layers 652-656 may comprise any or all of the features and functionality of the optical guiding layers as described above. The structure of the layers 652-656, as well as the other features of the composite guiding structure e.g. the separation between the layers, provide an overall mode distribution with a large diameter, which is configured to match that of an optical fibre. The large mode may be achieved through design of the edge coupler structure as well as appropriate selection of the materials used. The photonic chip in FIG. 6 comprises layers 652-656, and an optical waveguide made of silicon nitride, which as described above may be advantageous for coupling light from an optical fibre to the photonic chip.

Silicon nitride demonstrates properties which may be advantageous for edge couplers. However, the restrictive nature of many conventional edge coupler designs has meant that silicon nitride has not been a feasible candidate for use in edge coupler fabrication. According to an aspect of the present disclosure, a method of manufacturing a photonic chip is provided, which may facilitate the use of silicon nitride.

Figure 7:
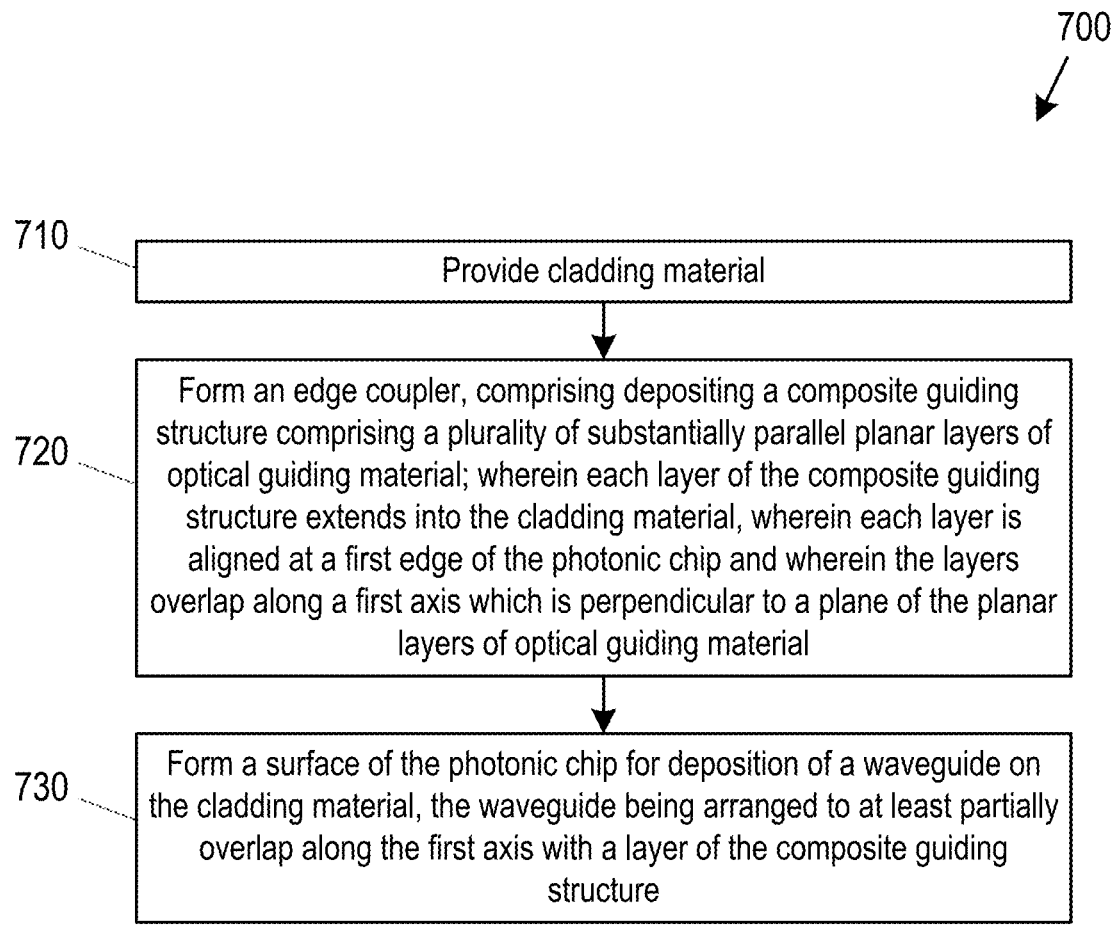
FIG. 7 is a flow chart illustrating process steps in a method of manufacturing a photonic chip.

FIG. 7 is a flow chart illustrating process steps in a method of manufacturing a photonic chip 700. In some examples, the method may be used to manufacture photonic chip 100 or photonic chip 200. Referring to FIG. 7, in a first step 710, the method comprises providing cladding material. In some examples, the cladding material may comprise silicon dioxide. In some examples, the cladding material may be provided as part of a wafer. In such examples, the wafer may comprise silicon dioxide formed on a silicon substrate. In a second step 720, the method further comprises forming an edge coupler, comprising depositing a composite guiding structure comprising a plurality of substantially parallel planar layers of optical guiding material, wherein each layer of the composite guiding structure extends into the cladding material, wherein each layer is aligned at a first edge of the photonic chip and wherein the layers overlap along a first axis which is perpendicular to a plane of the planar layers of optical guiding material In one example, the optical guiding material may comprise silicon nitride. In a third step 730, the method also comprises forming a surface of the photonic chip (e.g. upper surface) for deposition of a waveguide on the cladding material, the waveguide being arranged to at least partially overlap along the first axis with a layer of the composite guiding structure. In some examples, the surface for deposition of the waveguide may be a planar surface. In some examples, the surface for deposition of a waveguide may be an upper surface. In some aspects, the method 700 includes forming or depositing the waveguide.

The upper surface of the photonic chip is planar above the composite guiding structure and over an area where the waveguide will be deposited. As such, the photonic chip is arranged for deposition of the waveguide. The continuous planar upper surface of the photonic chip, including over the composite guiding structure, allows for addition of the waveguide into which light can be coupled from the composite guiding structure. The waveguide is provided, or located, above the composite guiding structure. As such, the photonic chip can be first provided with the composite guiding structure. The waveguide can be added as a separate, later and independent process. Thus, the manufacture of the composite guiding structure can be completed prior to addition to of the waveguide. This separation of the manufacture of the composite guiding structure and waveguide improves flexibility in the manufacturing process.

Figure 8:
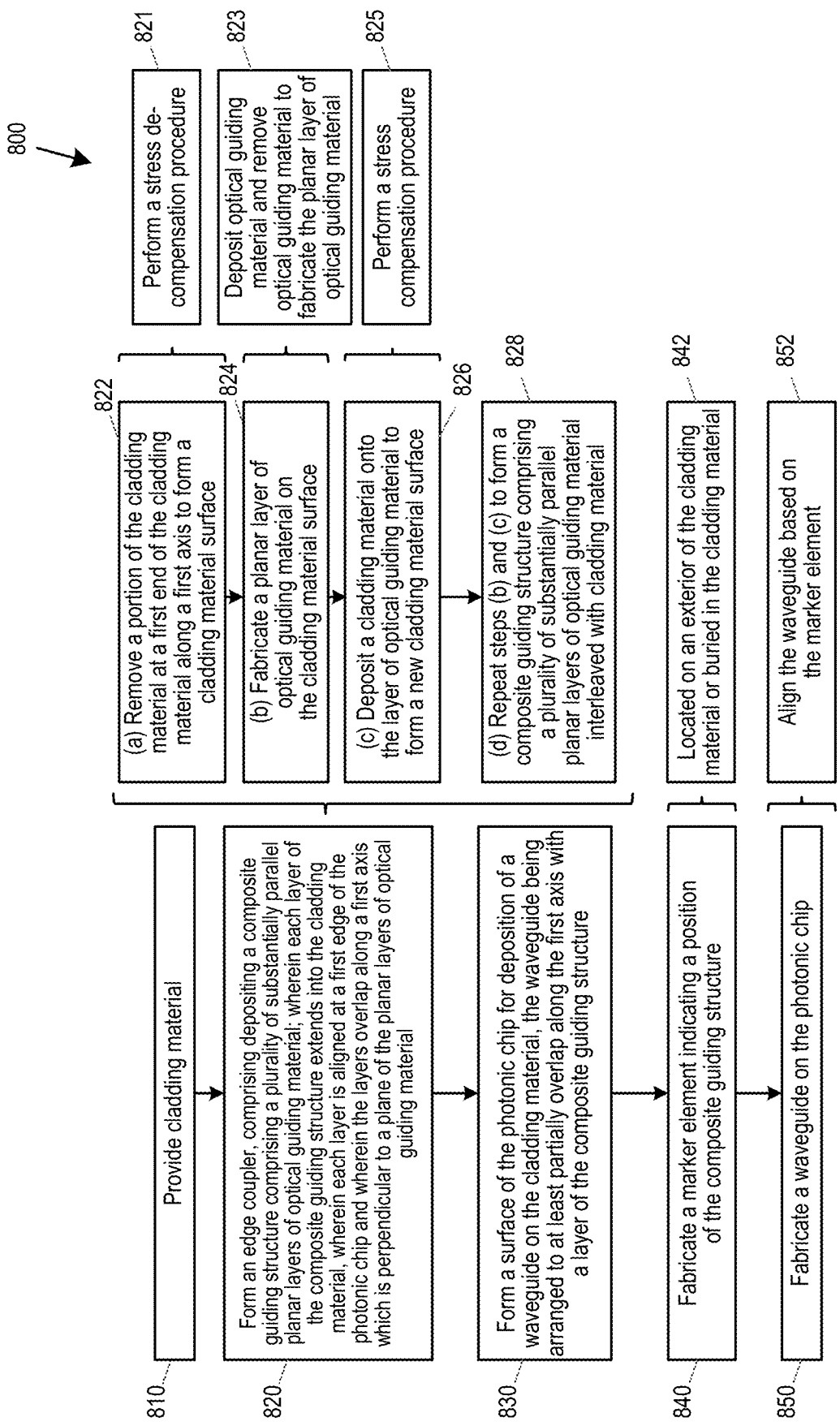
FIG. 8 is another flow chart illustrating process steps in a method of manufacturing a photonic chip.

FIG. 8 is a flow chart illustrating process steps in another example of a method of manufacturing a photonic chip 800. The method 800 illustrates one way in which the steps of the method 700 may be implemented and supplemented.

Referring to FIG. 8, in a first step 810, the method comprises providing cladding material. In one example, the cladding material may comprise silicon dioxide. In a second step 820, the method further comprises forming an edge coupler, comprising depositing a composite guiding structure comprising a plurality of substantially parallel planar layers of optical guiding material, wherein each layer of the composite guiding structure extends into the cladding material, wherein each layer is aligned at a first edge of the photonic chip and wherein the layers overlap along a first axis which is perpendicular to a plane of the planar layers of optical guiding material.

Second step 820 may comprise in step 822 (a) removing a portion of the cladding material at a first end of the cladding material along a first axis to form a cladding material surface. In one example, the deposited cladding material may comprise a thickness of about 15 μm and step 822 may comprise removing about 8 μm of cladding material from the deposited cladding material to form the cladding material surface. Step 822 may further comprise in step 821 performing a stress de-compensation procedure.

Second step 820 may also comprise in step 824, (b) fabricating a planar layer of optical guiding material on the cladding material surface; Step 824 may comprise, in step 823, depositing optical guiding material and removing optical guiding material to fabricate the planar layer of optical guiding material. In one example, step 823 may comprise a lithographic and etching step. In one example, the stress de-compensation procedure described in step 821, may provide a suitable substrate to fabricate thereon the planar layer of optical guiding material, as described in step 824.

Second step 820 may further comprise instep 826, (c) depositing a cladding material onto the layer of optical guiding material to form a new cladding material surface. Step 826 may comprise, in step 825, performing a stress compensation procedure.

Second step 820 may further comprise in step 828, repeating steps (b) and (c) to form a composite guiding structure comprising a plurality of substantially parallel planar layers of optical guiding material interleaved with cladding material. In some examples, steps (c) and (d) may be repeated twice to form a composite guiding structure with three layers of substantially parallel planar layers of optical guiding material. In one example, a stress compensation procedure may be carried out on an upper surface of the composite guiding structure. In one example, this may comprise depositing a further layer of cladding material on the composite guiding structure.

In a third step 830, the method comprises forming a surface of the photonic chip for deposition of a waveguide on the cladding material, the waveguide being arranged to at least partially overlap along the first axis with a layer of the composite guiding structure.

In a fourth step 840, the method comprises fabricating a marker element indicating a position of the composite guiding structure. In one example, the marker element may be fabricated via optical lithography. In step 842 the marker element may be located on an exterior of the cladding material or may be buried in the cladding material. In one example, locating the marker element on an exterior surface of the cladding material may comprise depositing a CMOS-compatible material e.g. silicon on the exterior surface of the cladding material. In one example, burying the marker element may comprise etching cavities in the cladding material. Following step 840, the photonic chip may comprise a full-compensated wafer structure with a planar upper surface. Such a wafer may be readily suitable for fabrication of further optical structures thereon.

In a fifth step 850, the method comprises fabricating a waveguide on the photonic chip. Step 850 may comprise, in step 852, aligning the waveguide based on the marker element. Following step 850, a photonic chip is produced comprising an edge coupler that can perform mode adaptation between an optical fibre and the photonic chip.

A photonic chip according to the present disclosure can therefore efficiently adapt the mode of an optical fibre to a waveguide that may form part of the photonic chip. The structure of the composite guiding structure and the arrangement of the waveguide enables this mode adaptation with minimal losses and with a small horizontal and vertical footprint. The mode adaptation is suitable for several types of optical fibres, thereby increasing the versatility of the photonic chip edge coupler.

The location of the waveguide above the composite guiding structure increases the production yield and efficiency in fabrication of the waveguide, as testing of the composite guiding structure may be carried out throughout its fabrication. Furthermore, the location of the waveguide above the guiding structure also puts the waveguide under reduced stress.

The method of manufacture of a photonic chip according to the present disclosure, based on multi-layer solutions, is obtainable using materials that are fully compliant with CMOS technology without the need for complex fabrication processes. The method of manufacture is suitable for manufacture using silicon nitride, which has desirable properties over conventional silicon, and is expected to acquire increased importance in future generations of transceivers with graphene integrated technologies.

The method of manufacture and photonic chip design enables maximum flexibility for fabrication of the waveguide, because the fabrication of the waveguide is completely separate from that of the composite guide structure forming the edge coupler. The method further enables the full-range of CMOS processes to be carried out on the chip including annealing or top-side processing of the silicon nitride waveguide.

The chip structure allows the addition of 2D materials on top of the waveguide cores, to implement modulation or detection functions. This is particularly useful for silicon nitride based waveguides which require an additional layer to achieve light-modulating action.

The chip structure also enables the realisation of a flat wafer substrate on which other modules may be readily fabricated. The fabrication can be adapted for either front end of line or back end of line processes. Such processes can usefully include wafer bonding processes, continuous film of graphene, transition metal dichalcogenide transfer and processing, and transfer printing processes of semiconductor membranes e.g. as used in hybrid photonic circuits. Such membranes may include indium phosphide based materials for production of active circuits such as lasers, amplifiers, modulators, detectors or switches.

A photonic chip according to the present disclosure also supports polarization diversity schemes with different types of polarization splitter and rotators (PSR). Such polarization diversity is not supported by conventional photonic chips comprising edge couplers. The capability of supporting polarization diversity ensures the management of arbitrary polarization states of the light in the input optical fiber.

One type of PSR is a compact PSR based on subwavelength structures which may be employed with a photonic chip according to the present disclosure. These structures are advantageous as they comprise a small footprint and could be usefully employed to split and rotate the polarization.

Another type of PSR is based on evanescent coupling with a structure in amorphous silicon. A common design for PSRs is based on adiabatic tapering and symmetry breaking, which can be implemented in amorphous silicon with a manageable footprint. The amorphous silicon structure can be deposited on top of a photonic chip according to the present disclosure formed from silicon nitride so that light is transferred evanescently to the PSR. At this stage, light is split into two branches (one of which undergoes a polarization rotation) in the PSR, which is coupled evanescently to two waveguides in the silicon nitride chip underneath.

A further type of PSR is based on bonding a silicon-on-oxide (SOI) structure on top of a photonic chip according to the present disclosure formed from silicon nitride. This type of PSR can be implemented by bonding a SOI chip on top of the multilayer structure so that the light couples evanescently to a waveguide in the polarization splitter in the SOI.

The disclosure describes a photonic chip comprising an edge coupler. In some aspects, the disclosure may be considered as for an edge coupler for a photonic chip or an edge coupler formed on a photonic chip. The disclosure describes the composite guiding structure comprising planar layers as separate to the cladding material. In some aspects, the disclosure may be considered as for a composite guiding structure comprising the planar layers and the cladding material.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A photonic chip comprising:
   cladding material; and
   an edge coupler, wherein the edge coupler comprises a composite guiding structure comprising a plurality of substantially parallel planar layers of optical guiding material;
   wherein:
   each layer of the composite guiding structure extends into the cladding material,
   each layer is aligned at a first edge of the photonic chip,
   the layers overlap along a first axis which is perpendicular to a plane of the planar layers of optical guiding material,
   the photonic chip is arranged for deposition of a waveguide on the cladding material, the waveguide being arranged to at least partially overlap along the first axis with a layer of the composite guiding structure, and
   a width of each layer of the composite guiding structure decreases from a first end of the layer, which is at the first edge of the photonic chip, to a second end of the layer opposite the first end.

2. The photonic chip according to claim 1, wherein the photonic chip is arranged for deposition of a waveguide on an upper surface of the cladding material.

3. The photonic chip according to claim 1, wherein a length of at least one of the layers of the composite guiding structure is different to a length of at least one other of the layers of the composite guiding structure or wherein a length of each layer of the composite guiding structure is different to a length of each of the other layers of the composite guiding structure.

4. The photonic chip according to claim 3, wherein the length of each of the plurality of layers increases with reduced distance from a surface on which the photonic chip is arranged for deposition of the waveguide.

5. The photonic chip according to claim 1, wherein the photonic chip is arranged for deposition of a waveguide on a surface of the cladding material, and wherein the waveguide is arranged to at least partially overlap a layer of the composite guiding structure that is closest to the waveguide.

6. The photonic chip according to claim 5, wherein the photonic chip is arranged for deposition of a waveguide on a surface of the cladding material, and wherein the waveguide is arranged to at least partially overlap only the layer of the composite guiding structure that is closest to the waveguide.

7. The photonic chip according to claim 1, wherein the composite guiding structure comprises three substantially parallel planar layers of optical guiding material.

8. The photonic chip according to claim 1, wherein the composite guiding structure comprises an upper layer, a middle layer, and a lower layer and wherein a length of the middle layer is greater than twice a length of the lower layer.

9. The photonic chip according to claim 8, wherein the composite guiding structure comprises an upper layer, a middle layer, and a lower layer and wherein a length of the upper layer is greater than twice a length of the middle layer.

10. The photonic chip according to claim 1, wherein a separation along the first axis between the each of the plurality of layers in the composite guiding structure is equal.

11. The photonic chip according to claim 1, wherein a separation along the first axis between the composite guiding structure and a surface of the cladding material for deposition of a waveguide thereon, is greater than the separation between each of the plurality of the layers.

12. The photonic chip according to claim 1, further comprising a marker element, the marker element indicating a position of the edge coupler.

13. The photonic chip according to claim 1, wherein the waveguide comprises a first end that at least partially overlaps with a layer of the composite guiding structure in a direction of propagation of light along a layer of the plurality of layers, and wherein a width of the waveguide increases away from the first end.

14. A method of manufacturing a photonic chip, the method comprising:
   providing cladding material;
   forming an edge coupler, comprising depositing a composite guiding structure comprising a plurality of substantially parallel planar layers of optical guiding material, wherein forming the edge coupler comprises:
   removing a portion of the cladding material at a first end of the cladding material along a first axis to form a cladding material surface;
   fabricating a planar layer of optical guiding material on the cladding material surface;
   depositing a cladding material onto the layer of optical guiding material to form a new cladding material surface; and
   repeating the fabricating a planar layer of optical guiding material and the depositing a cladding material onto the layer of optical guiding material to form a composite guiding structure comprising a plurality of substantially parallel planar layers of optical guiding material interleaved with cladding material; and wherein:

each layer of the composite guiding structure extends into the cladding material, each layer is aligned at a first edge of the photonic chip, and the layers overlap along a first axis which is perpendicular to a plane of the planar layers of optical guiding material; and forming a surface of the photonic chip for deposition of a waveguide on the cladding material, the waveguide being arranged to at least partially overlap along the first axis with a layer of the composite guiding structure.

15. The method according to claim 14, wherein the removing a portion of the cladding material comprises performing a stress de-compensation procedure and wherein the depositing a cladding material onto the layer of optical guiding material comprises performing a stress compensation procedure.

16. The method according to claim 14, wherein the fabricating a planar layer of optical guiding material comprises depositing optical guiding material and removing optical guiding material to fabricate the planar layer of optical guiding material.

17. The method according to claim 14, further comprising fabricating a marker element indicating a position of the composite guiding structure.

18. The method according to claim 14, further comprising fabricating a waveguide on the photonic chip, wherein fabricating the waveguide comprises aligning the waveguide based on the marker element.

* * * * *